United States Patent [19]

Schwarz

[11] Patent Number: 4,597,417

[45] Date of Patent: Jul. 1, 1986

[54] LIFTING UNIT FOR A ROTATIONAL DOBBY

[75] Inventor: Rudolf Schwarz, Horgen-Zuerich, Switzerland

[73] Assignee: Staeubli Ltd., Horgen-Zuerich, Switzerland

[21] Appl. No.: 657,719

[22] Filed: Oct. 4, 1984

[30] Foreign Application Priority Data

Oct. 7, 1983 [CH] Switzerland .............. 5477/83

[51] Int. Cl.[4] .............................................. D03C 1/00
[52] U.S. Cl. ....................................... 139/76; 139/66 R
[58] Field of Search ................ 139/76, 74, 66 R, 66 A

[56] References Cited

U.S. PATENT DOCUMENTS

| 3,724,511 | 4/1973 | Kleiner | 139/66 R |
| 3,726,323 | 4/1973 | Kleiner | 139/66 R |
| 3,804,128 | 4/1974 | Amigues | 139/66 R |
| 4,354,531 | 10/1982 | Surkamp et al. | 139/66 R |
| 4,367,770 | 1/1982 | Schwarz | 139/66 R |

FOREIGN PATENT DOCUMENTS

| 0129123 | 12/1984 | European Pat. Off. | 139/76 |
| 2036643 | 12/1971 | Fed. Rep. of Germany | 139/66 R |
| 2938451 | 8/1979 | Fed. Rep. of Germany | 139/66 R |

Primary Examiner—Henry S. Jaudon
Assistant Examiner—Joseph S. Machuga
Attorney, Agent, or Firm—Flynn, Thiel, Boutell & Tanis

[57] ABSTRACT

A normal position of a shifting wedge of a lifting unit for a rotational dobby is achieved by a movable arrangement of the recess in a locking block which receives the wedge and has rigid side flanks. The entire locking block is, against the urging of a spring, supported for movement translatorically and/or swingably within certain limits, wherein the center axis of the recess moves only insignificantly out of its normal radial orientation.

21 Claims, 11 Drawing Figures

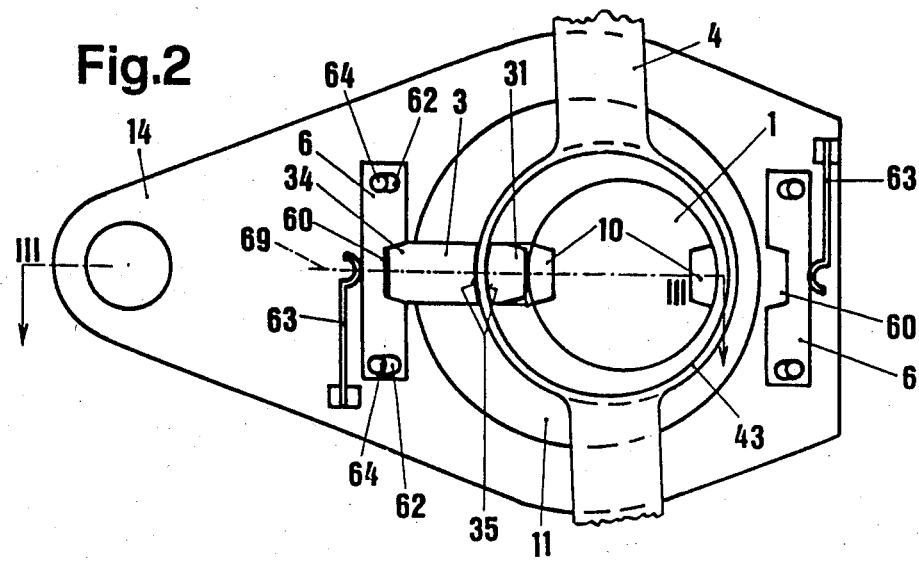
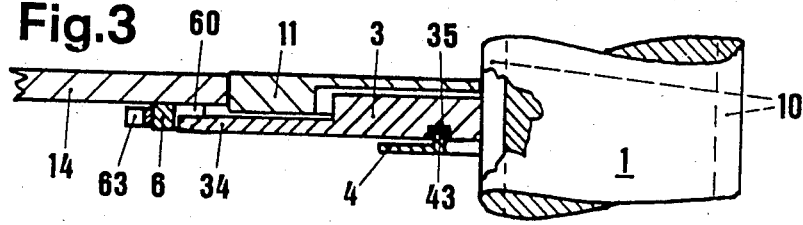
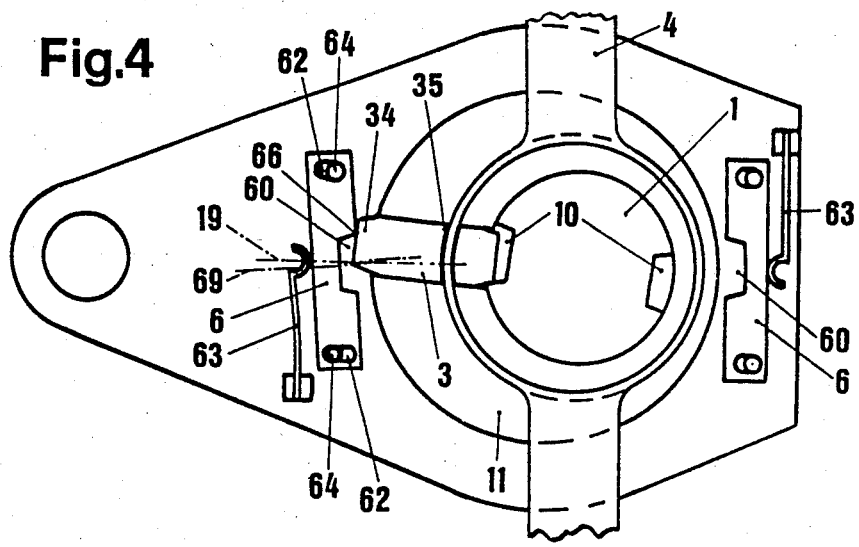

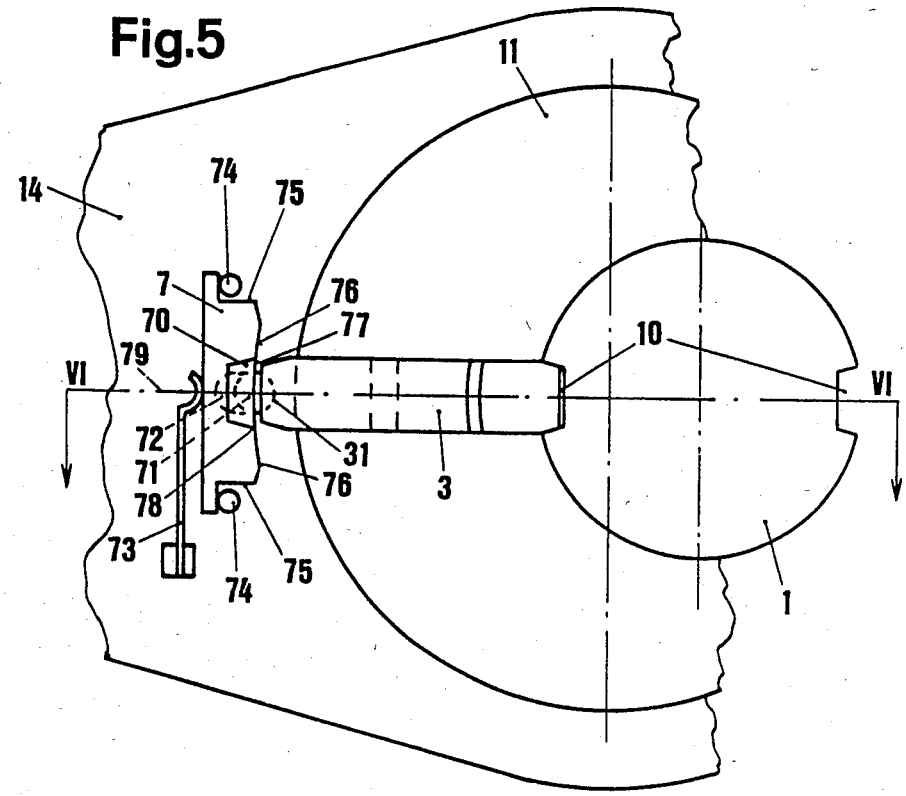
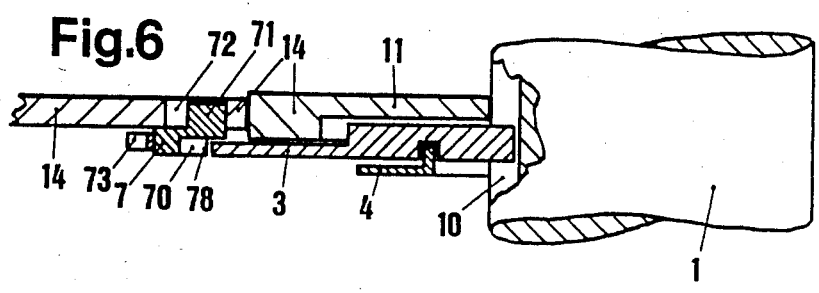

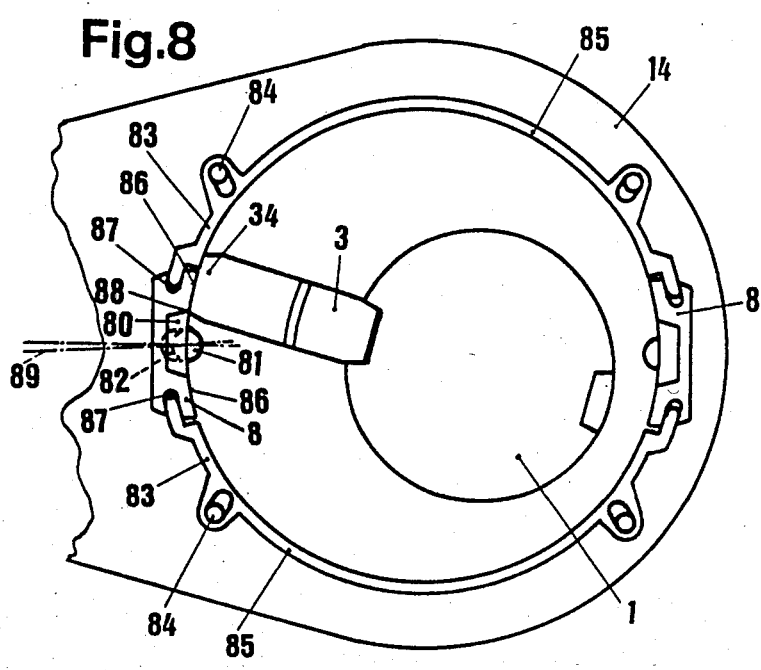
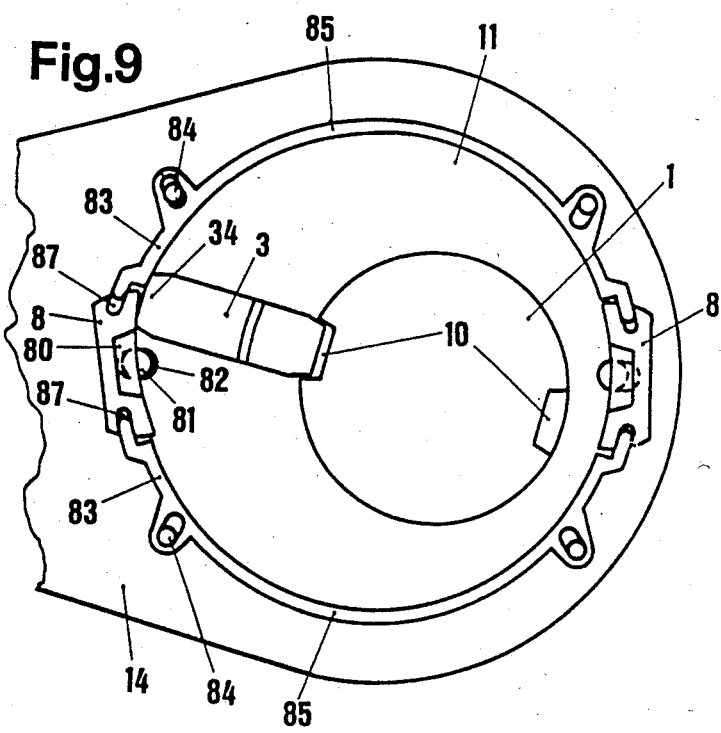

LIFTING UNIT FOR A ROTATIONAL DOBBY

FIELD OF THE INVENTION

The invention relates to a lifting unit of a rotational dobby and, more particularly, to a lifting unit which includes an eccentric ring supported on a drive shaft, a shifting wedge movably supported on the eccentric ring, a movable shifting arm which is operatively coupled to the shifting wedge, and a connecting rod which is supported on the eccentric ring and is operatively coupled to a heddle frame.

BACKGROUND OF THE INVENTION

Such lifting units have become known, for example, from U.S. Pat. Nos. 3,724,511, 3,726,323 and German Auslegeschrift No. 29 38 451 (corresponds to U.S. Pat. No. 4,354,531) . A characteristic of these known embodiments is that when the shifting wedge is not in engagement with the groove of the drive shaft, it is held by a locking mechanism which consists of a V-shaped, stationary notch or groove with springy side surfaces, which side surfaces are formed by special slide members which are under a spring force or by the ends of two approximately semicircular, resiliently mounted guide rails. The springy arrangement, which was chosen among others for safety reasons, prevents for example faulty control of the shifting wedge and/or the destruction of a machine part when a shifting wedge incompletely engages the groove of the drive shaft. Through an elastic yielding and springing back of the lateral notch boundaries, the outer end of the shifting wedge is fed to the notch or the groove.

In order to ensure that, during the next control of the shifting wedge, namely the disengagement of its outer end from the notch and the engagement of its inner end in a groove of the temporarily stationary drive shaft, the wedge does not hit the rigid groove edge of the shaft groove but instead slides interference-free into the groove, a precise maintaining of the specified position of the notch or groove and thus the shifting wedge is absolutely necessary.

In the known individually springily arranged side surfaces of the V-notch or groove, there is a possibility that one edge of the notch, which edge defines the side surface, will be urged back slightly due to an incorrect position of the wedge. The wedge is thus no longer exactly aligned with the shaft groove by the notch, so that it cannot move directly and unhindered into the groove of the drive shaft, which can result in a faulty control of the weaving machine.

SUMMARY OF THE INVENTION

A goal of the invention is to overcome this disadvantage by providing a notch for holding the outer wedge end which permits no deviation or only a minimum deviation of the center axis of the wedge from the radial direction of the center axis of the stationary groove of the drive shaft. However, at the same time, an arrangement for avoiding breakage from an abnormal position of the wedge is to be provided.

This is achieved inventively by providing a lifting unit having a locking block with a groovelike recess with rigid flanks which opens toward and a spring which biases the locking block toward the drive shaft, the locking block being supported for limited movement so that a center axis of the recess is changeable with small deviations with respect to a radius line of the drive shaft and the locking block is movable against the force of the spring linearly and/or pivotally.

Since the locking block itself is not subject to any elastic deformation, the recess always has a constant shape. The flexibility during faulty controls, which flexibility is demanded for known reasons, is assured through movement of the entire locking block, against a spring force, approximately in the direction of the center axis of the recess.

BRIEF DESCRIPTION OF THE DRAWINGS

Various exemplary embodiments of inventive lifting units for rotational dobbies are illustrated in the drawings, in which:

FIG. 2 is a fragmentary side view which illustrates a rotational lifting unit embodying the invention;

FIG. 3 is a sectional view taken along the line III—III of FIG. 2;

FIG. 4 is a view similar to FIG. 2 showing the lifting unit of FIG. 2 with an improperly positioned shifting wedge being carried along by the drive shaft;

FIG. 5 is a fragmentary side view of a modified embodiment of the lifting unit of FIG. 2, showing a locking block and its support, wherein the switching arm, for the purpose of simplifying the illustration, has been omitted;

FIG. 6 is a sectional view taken along the line VI—VI of FIG. 5;

FIG. 8 is a view similar to FIG. 2 showing a further embodiment of the lifting unit of FIG. 2, including guide and safety rails for the shifting wedge and locking blocks which are coupled to the rail ends, the unit being shown during normal movement of the shifting wedge by the drive shaft, wherein the switching arm, for the purpose of simplifying the illustration, has been omitted;

FIG. 9 is a view similar to FIG. 8 showing the lifting unit of FIG. 8 during an abnormal position of the shifting wedge;

DETAILED DESCRIPTION

Figure 1:
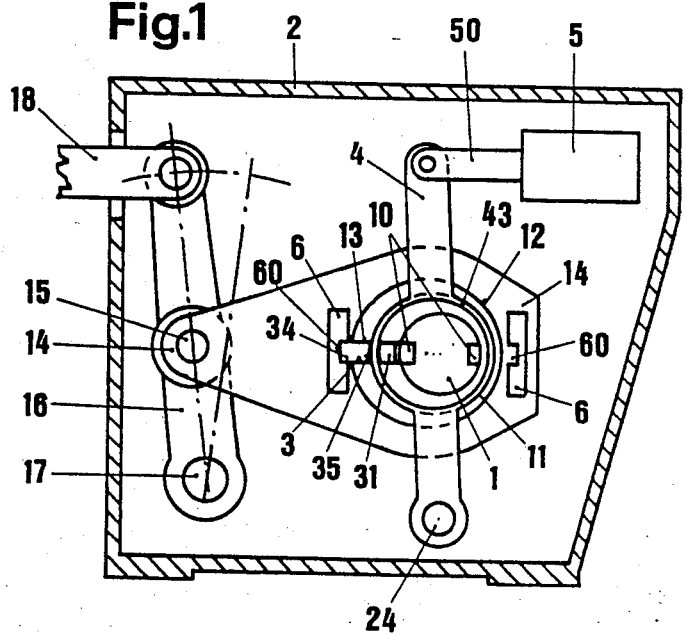
FIG. 1 is a diagrammatic sectional side view of a conventional rotational dobby which has a lifting unit and can be attached to a conventional weaving machine.

FIG. 1 illustrates a conventional rotational dobby which includes a drive shaft 1 which is intermittently rotated through 180°, is rotatably supported in a housing 2 and has two oppositely lying longitudinal grooves 10 for receiving the inner end 31 of a radially movable shifting wedge 3. Two locking blocks 6 have groove-shaped recesses 60 which open toward the drive shaft 1 and serve to receive the outer end 34 of the shifting wedge 3. The shifting wedge 3 is moved according to a pattern by a ring 43 of a switching arm 4, which is swingably supported on a housing-fixed axle 24 and is controlled through a connecting piece 50 by a conventional control apparatus 5 for dobbies. The ring 43 of the switching arm 4 slides in an arcuate guide groove 35 in the shifting wedge 3, which is supported in a radial guide groove 13 in the eccentric ring 11, which in turn is rotatably supported on the drive shaft 1 and is rotatably supported in a circular bore 12 in a connecting rod 14. The guide groove 13 permits radial movement and prevents angular movement of the shifting wedge 3 relative to the eccentric ring 11. The movement of the connecting rod 14 is transmitted through a bolt 15 to a rocking lever 16 which pivots on a housing-fixed axle 17. The connecting rod 18, which is operatively coupled in a conventional manner to a conventional heddle frame or heddle (not illustrated), is hinged to the free end of the rocking lever 16.

FIG. 1 illustrates a lifting unit which is not moving, the switching arm 4 of which has been swung to the left and has disengaged the inner end 31 of the shifting wedge 3 from the groove 10 of the drive shaft. The outer end 34 of the shifting wedge 3 extends into the recess 60 of the left locking block 6 which is supported on the connecting rod 14. The shifting wedge 3 and thus the eccentric ring 11 are secured against rotation. The connecting rod 14 remains inactive and the associated heddle frame remains in its position.

To change the position of the heddle frame, the switching arm 4 is pivoted clockwise about its bearing axis 24 in a conventional manner (see U.S. Pat. No. 3,724,511), whereby the shifting wedge 3 is carried along to the right and engages with its inner end 31 a groove 10 in the drive shaft 1. During the next 180° rotation of the drive shaft 1, the shifting wedge 3 and the eccentric ring 11 are carried along therewith through 180°. The connecting rod 14 which sits on the eccentric ring is, during this rotation, moved to the right in FIG. 1, which causes the heddle frame to change its position.

In connection with the first embodiment of the invention, which is illustrated in FIGS. 2 to 4, the operation of the lifting unit is discussed. For clarity, the housing, control apparatus, switching arm, rocking lever and connecting rod are left out.

The recess 60 for receiving the outer end 34 of the shifting wedge 3 is provided in the locking block 6 and opens toward the drive shaft. The center axis of this recess, which center axis is positioned in a rest condition exactly radially with respect to the drive shaft 1, is identified with reference numeral 69. The locking block 6 is supported for limited movement on the connecting rod 14 by two slots 62 therein which slidingly receive pins 64 on the connecting rod 14. The slots 62 extend approximately parallel with respect to the center axis 69 of the recess 60, or converge slightly toward the centerpoint of the drive shaft 1. A leaf spring 63 which is secured on the connecting rod 14 presses the locking block 6 in the direction of the drive shaft 1, therein the pins 64 act as stops at the ends of the slots 62. Two of the locking blocks 6, which lie diametrically opposite one another, are provided. In place of the pins 64, it is also possible to provide screws, guideways or the like as parts of the connecting rod 14, which parts extend into the slots 62.

FIG. 2 illustrates the shifting wedge 3 in the base position, namely, disengaged from the groove 10 of the drive shaft and extending into the recess 60. The drive shaft 1 is in its standstill phase. During its next 180° rotation, the shifting wedge 3 is not carried along and the heddle frame which is connected to the lifting unit is not moved.

When the heddle frame is supposed to change its position, the switching arm 4 is moved and carries along the wedge 3 with its ring 43 which lies in the guide groove 35 of the shifting wedge 3. The inner end 31 of the wedge moves into the groove 10 of the drive shaft 1 and its outer end disengages from the recess 60, which control position is shown in FIGS. 5 and 6. During the next 180° rotation of the drive shaft 1, the shifting wedge 3 and thus the eccentric ring 11 is carried along. Through this, the connecting rod 14, the rocking lever 16 and the connecting rod 18 move the heddle frame.

Should the shifting wedge 3 for any reason be insufficiently controlled and, at the start of the rotation of the drive shaft 1 in the arrow direction in FIG. 4, extend simultaneously both into the groove 10 and also into the recess 60, this would result, due to the working force of the drive shaft, in a blocking action and possibly breakage of one or more parts. Through the limited movable support of the locking block 6, it can, in particular due to a trapezoidally shaped outer end 34 of the shifting wedge 3, give way against the force of the spring 63. One then obtains the position according to FIG. 4, in which the wedge 3 sits on a side edge 66 of the recess 60 and does not fully extend into the groove 10. The lifting unit can, during this movement, continue to work practically in the illustrated position. However, there exists an undesired instability factor.

When, shortly before the end of the 180° swing, the shifting wedge 3, which partially engages the groove 10, reaches the opposite locking block 6, a destruction of a part does not occur, since this locking block also gives way against the force of its spring 63. With respect to this, reference is made to later discussions relating to FIG. 7. During the brief standstill of the drive shaft 1, after its 180° rotation, the outer end 34 of the wedge 3, under the action of the spring 63, is again caught in the recess 60 and is centered so that, during the next control operation, it is positioned in front of the groove 10 and can move into the groove without problems. It is important that the center axis 69 of the recess, during the displacement of the locking block 6, is inclined only insignificantly toward the radius 10 of the stationary drive shaft.

Figure 7:
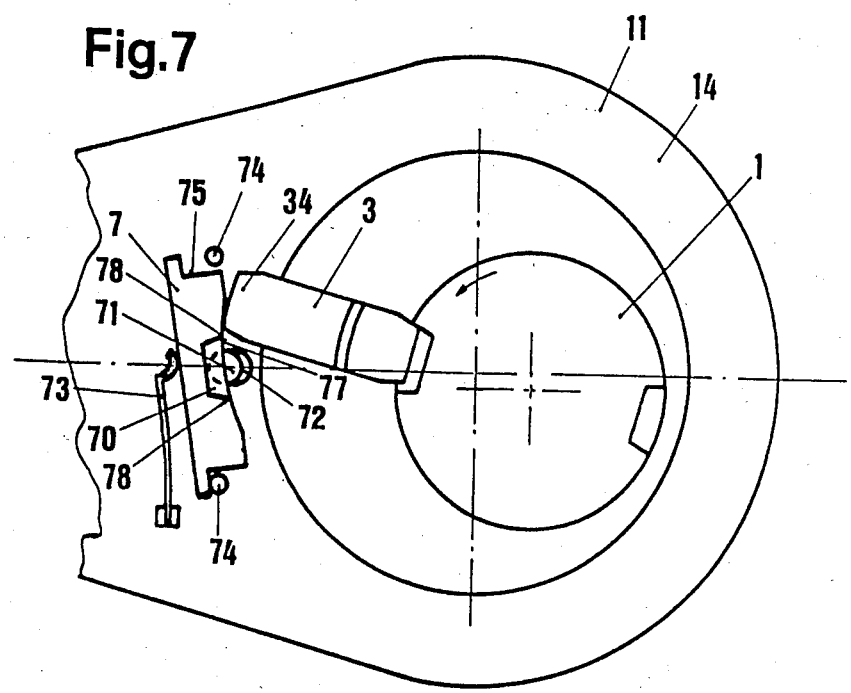
FIG. 7 is a view similar to FIG. 5 but showing an abnormal position of the shifting wedge.

A modification of the support of the locking block on the connecting rod 14 can be taken from FIGS. 5 to 7. A locking block 7 which again has a groove-shaped recess 70 is provided with a center pin 71 which extends into a rectilinear slot 72 in the connecting rod 14, which causes the locking block to be limited in its radial movement with respect to the drive shaft against the force of the spring 73. Two pins 74 engage end surfaces 75 of the locking block, are secured on the connecting rod, and serve as directional stops for defining the base position of the locking block 7.

During an abnormal position of the shifting wedge, including for example an incomplete engagement and disengagement, the locking block 7 can give way rearwardly linearly and/or pivotally during rotation of the drive shaft 1 against the force of the spring 73, whereby the corner edges 78 of the recess 70, the connecting line 77 of which intersects the centerpoint of the pin 71, remain approximately symmetrical with respect to the connecting line between the centerpoint of the pin 71 and the centerpoint of the drive shaft 1.

This movement of giving way also takes place if, as illustrated in FIG. 7, an abnormally positioned shifting wedge 3 hits, during its swing with the drive shaft in a direction according to the arrow, an inner surface 76 of the locking block 7. The inner surfaces 76 adjacent the recess 70 are preferably beveled or arc-shaped.

If the connecting line 77 between the two corner edges 78 of the opening of the recess 70 extends through the centerpoint of the pin 71, the advantage is obtained that the opening of the recess in every type of engagement with the outer end 34 of the shifting wedge 3 remains exactly symmetrical with respect to the center axis 79 and moves the shifting wedge which is in a normal position into the switching position. Thus, through the symmetry of the recess, an abnormally controlled shifting wedge is also transferred into the normal position.

If the rotational lifting unit is constructed at least partially according to U.S. Pat. No. 3,726,323, namely if, as shown in FIGS. 8 and 9, semicircular springy guide and safety rails 85 are provided which extend coaxially with respect to the engaging circular bearing surfaces on eccentric ring 11 and connecting rod 14, then it is possible to utilize the ends 83 of the guide rails 85, which swing resiliently about the adjacent fixed pins 84 of the connecting rod 14, for guiding and as springs for locking blocks 8.

The locking blocks 8 each have a recess 80 for receiving the outer end 34 of the shifting wedge 3. For the movable support and for movement limiting, the locking block 8, like the locking block 7, is provided with a pin 81 which extends into a slot 82 in the connecting rod 14. One notch 87 is arranged on each side surface of the locking block 8, into which notch slidingly extends a respective free springy end 83 of the guide rail 85. This makes it possible to hold the locking block, which is swingable about the pin 81, in the base position (FIG. 8) in which the center axis 89 of the recess 80 extends radially with respect to the stationary drive shaft 1, from which position occurs a problemless engagement of the caught shifting wedge in a groove 10 of the stationary drive shaft 1.

FIG. 8 illustrates the normal rotation of the lifting unit. The shifting wedge 3, which extends into the groove 10, is carried along by the drive shaft 1. The outer end 34 of the shifting wedge slides on the inner edge 86 of the locking block or slides near the inner edge 86 of the locking block, which inner edge 86 is in alignment with the inner edge of the guide rail 85. The shifting wedge 3 is thus held during its movement through 180°.

The position which is illustrated in FIG. 9 results if the shifting wedge, in the region of the righthand locking block, did not fully move into the groove 10 of the drive shaft 1 and was carried along by the drive shaft, which rotates counterclockwise, into the illustrated position. The shifting wedge 3 thereby presses the springy guide rail 85 outwardly, which is possible due to the movable support of the rail on the pins 84. Through the springy end 83 of the guide rail 85, which end swings about the pin 84, the upper part of the locking block 8 is swung outwardly with and is pivoted about the pin 81 by the shifting wedge 3 which, during the rotating of the drive shaft 1, arrives abnormally, so that the outer end 34 of the shifting wedge 3 slides from the guide rail 85 directly onto the inner edge 86 of the locking block and is held centered after its engagement with the recess 80 due to the force of the springy ends 83.

The position which is illustrated in FIG. 9 would also be obtained if the drive shaft 1 were rotating clockwise and the shifting wedge in the region of the left locking block did not fully move into the groove 10 of the drive shaft. The trapezoidal end 34 of the shifting wedge pushes on the locking block at the corner edge 88 of the recess and moves it into the illustrated position. The end 83 of the guide rail is also moved against its own spring force, so that the shifting wedge 3 can move along in its abnormal position without any breakage occurring.

In all of the aforedescribed exemplary embodiments, the locking blocks 6, 7, 8 are each arranged on the connecting rod 14. However, it is also possible to arrange them on a machine-fixed part.

Figure 10:
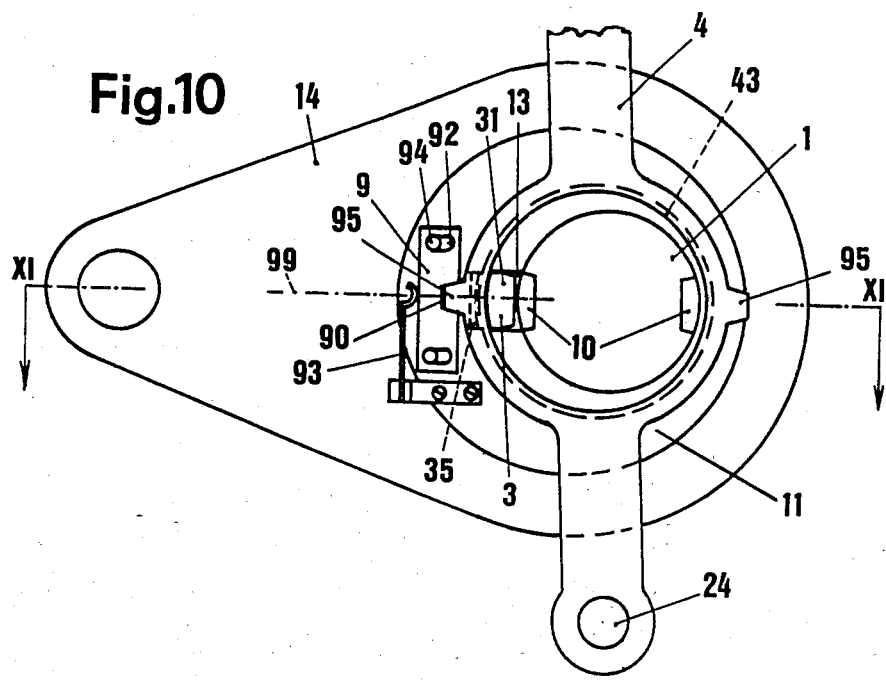
FIG. 10 is a view similar to FIG. 2 which illustrates a further modified embodiment of the lifting unit of FIG. 2.
Figure 11:
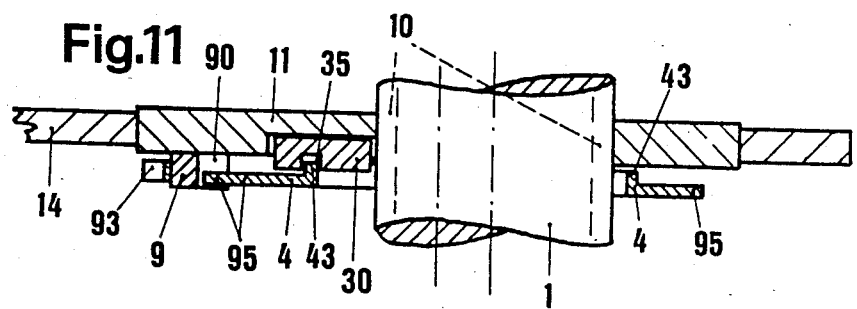
FIG. 11 is a sectional view taken along the line XI—XI of FIG. 10.

Compared with the so-far described embodiments, in which two locking blocks 6, 7 or 8 are each mounted on the connecting rod 14, in the example according to FIGS. 10 and 11 only one locking block 9 is provided. The locking block 9 has a recess 90 directed toward the drive shaft 1, is mounted on the eccentric ring and is supported slidingly like the locking block 6 through two slots 92, into which extend respective pins 94 on the eccentric ring 11. The shifting wedge 30, which is shortened by the amount of the outer trapezoidal end, is slidingly supported in a radially extending guideway 13 in the eccentric ring. It has its inner end 31, which can extend into one of the grooves 10 of the drive shaft 1, and a guide groove 35 for the ring 43 of the switching arm 4. Projecting radially from the ring 43 are two diametrically opposed cams 95, which can engage the recess 90 in the locking block 9 and thus hold the locking block and the eccentric ring in a desired position. The apparatus is supplemented by the spring 93 which is secured on the eccentric ring 11 and urges the locking block 9 inwardly.

The switching arm 4 can be controlled or swung into one of three different positions, where it then remains during rotation of the drive shaft 1 through 180°. During a 180° rotation of the drive shaft when the shifting wedge 30 does not extend into a groove 10, the eccentric ring 11 is held by engagement of one of the two cams 95 of the switching arm 4 and the locking block 9. The connecting rod 14 and the attached heddle frame thus do not move.

In place of the cams 95, it is possible to provide an outward extension on the shifting wedge 30 which projects away from the center of the drive shaft 1 so that its outer end extends, in the illustrated condition, into the recess 90 of the locking block 9.

In all described embodiments, it is possible to provide, in place of one switching arm with one switching ring as described in U.S. Pat. Nos. 3,724,511 and 3,726,323, two individual switching arms having guide cams which are offset by 180° and which engage the guide groove of the shifting wedge, as described in U.S. Pat. No. 3,804,128, or a horseshoe-shaped switching arm. The recesses 60, 70, 80 and 90 which receive the end 34 of the shifting wedge 3 may be rectangular instead of trapezoidal, or may have an opening which enlarges radially outwardly, so that during locking only the outer edges of the opening come into contact with the flanks of the shifting wedge.

With all of the above-described embodiments, a precise positioning of the stationary shifting wedge is achieved, which assures a quick and satisfactory engagement of the controlled shifting wedge with the groove of the drive shaft. At the same time, however, possible abnormal positions of the shifting wedge are caught and corrected without damage. This catching of an incorrectly positioned or insufficiently controlled shifting wedge from both working directions is achieved by the movable support of the locking block which permits its outward translatoric and/or swinging movement against the force of a spring in a radial direction away from the drive shaft 1, whereby the recess and in particular its opening move only insignificantly from the center axis. During the swinging movement of the locking block 6, 7, 8 or 9, its centerpoint lies approximately in the region of the center of the outer end of the opening of the corresponding recess 60, 70, 80 or 90 and is practically identical with the center of the outer end of the shifting wedge prior to its engagement with the recess. Thus, an inclined position of the opening line of the recess results in a negligible limitation of its opening width compared to the end of the shifting wedge 3.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A rotational dobby, comprising: a rotatably supported shaft having a groove therein; an eccentric ring rotatably supported on said shaft; a connecting rod which is rotatably supported on said eccentric ring, moves substantially radially of said shaft in response to rotation of said eccentric ring, and is adapted to be operatively coupled to a heddle frame for effecting movement thereof; a shifting wedge supported on said eccentric ring for radial movement between a radially inner position and a radially outer position and means for preventing angular movement of said shifting wedge relative to said eccentric ring, said shifting wedge having a radially inner end which is received in said groove in said shaft when said shifting wedge is in its radially inner position; a movably supported switching member and control means for effecting movement of said switching member according to a predetermined pattern, said switching member being operatively coupled to said shifting wedge and effecting radial movement of said shifting wedge relative to said eccentric ring in response to movement of said switching member by said control means; a unitary locking block which is spaced radially from said shaft and is supported for limited movement radially of said shaft and for limited pivotal movement about a pivot axis spaced from and substantially parallel to said shaft, said locking block having means defining thereon two spaced flank surfaces which face in opposite directions circumferentially of said shaft, are disposed symmetrically on opposite sides of a centerline, and are fixed against movement relative to said locking block and each other; resilient means for yieldably urging said locking block radially inwardly relative to said shaft and pivotally toward a position in which said centerline is substantially parallel to the direction of radial movement of said shifting wedge; and means for preventing rotation of said eccentric ring about the axis of rotation of said shaft when said shifting wedge is in said radially outer position, including said locking block being supported on said connecting rod and being fixed against angular movement relative thereto about said shaft, and including said shifting wedge having a portion which is received between said flank surfaces on said locking block when said shifting wedge is in said radially outer position.

2. The rotational dobby according to claim 1, including fixed stop means on said connecting rod and engageable with said locking block, and wherein said resilient means includes a spring which urges said locking block against said fixed stop means, said locking block being movable away from said fixed stop means against the urging of said spring.

3. The rotational dobby according to claim 1, including two of said locking blocks which are supported on said connecting rod on diametrically opposite sides of said shaft.

4. The rotational dobby according to claim 3, including two resilient, approximately semicircular guide rails which are supported on said connecting rod concentric with and on diametrically opposite sides of said shaft and which can engage a radially outer end of said shifting wedge during angular movement of said shifting wedge by said shaft, said resilient means including said guide rails having ends which engage notches provided in said locking blocks.

5. The rotational dobby according to claim 1, wherein said locking block has two slots therein which each extend approximately parallel to said centerline and which each slidably receive a respective pin which is fixedly secured on said connecting rod.

6. The rotational dobby according to claim 1, wherein said locking block has a projecting pin thereon which is coaxial with said pivot axis of said locking block, and wherein said pin extends into a slot which is provided in said connecting rod and which extends substantially radially of said shaft.

7. The rotational dobby according to claim 1, wherein said locking block has thereon a side surface which faces said shaft and has means defining a recess in said side surface, said flank surfaces being located in said recess on opposite sides thereof, and wherein portions of said side surface on opposite sides of said recess are inclined relative to said centerline and serve as guide surface for a radially outer end of said shifting wedge.

8. The rotational dobby according to claim 1, wherein said pivot axis of said locking block intersects said centerline at a point on said centerline which is substantially intermediate the radially inner ends of said flank surfaces.

9. The rotational dobby according to claim 1, wherein said resilient means includes a leaf spring which is fixedly mounted at one end on said connecting rod, has its other end disposed against a side of said locking block remote from said shaft, and extends in a direction approximately perpendicular to said centerline.

10. The rotational dobby according to claim 1, wherein said locking block has on each end thereof a stop surface which faces said shaft, and including two spaced pins which are fixedly supported on said connecting rod and which can each engage a respective one of said stop surfaces on said locking block.

11. The rotational dobby according to claim 1, wherein said shaft has two said grooves therein on diametrically opposite sides thereof.

12. A rotational dobby, comprising: a rotatably supported shaft having a groove therein; an eccentric ring rotatably supported on said shaft; a connecting rod which is rotatably supported on said eccentric ring, moves substantially radially of said shaft in response to rotation of said eccentric ring, and is adapted to be operatively coupled to a heddle frame for effecting movement thereof; a shifting wedge supported on said eccentric ring for radial movement between a radially inner position and a radially outer position and means for preventing angular movement of said shifting wedge relative to said eccentric ring, said shifting wedge having a radially inner end which is received in said groove in said shaft when said shifting wedge is in its radially inner position; a movably supported switching member and control means for effecting movement of said switching member according to a predetermined pattern, said switching member being operatively coupled to said shifting wedge and effecting radial movement of said shifting wedge relative to said eccentric ring in response to movement of said switching member by said control means; a unitary locking block which is spaced radially from said shaft and is supported for limited movement radially of said shaft and for limited pivotal movement about a pivot axis spaced from and substantially parallel to said shaft, said locking block having means defining thereon two spaced flank surface which face in opposite directions circumferentially of said shaft, are disposed symmetrically on opposite sides of a centerline, and are fixed against movement relative to said locking block and each other; resilient means for yieldably urging said locking block radially inwardly relative to said shaft and pivotally toward a position in which said centerline is substantially parallel to the direction of radial movement of said shifting wedge; and means for preventing rotation of said eccentric ring about the axis of rotation of said shaft when said shifting wedge is in said radially outer position, including said locking block being supported on said eccentric ring and being fixed against angular movement relative thereto about said shaft, and including said switching member having a portion which is received between said flank surfaces on said locking block when said shifting wedge is in said radially outer position.

13. The rotational dobby according to claim 12, including fixed stop means on said eccentric ring and engageable with said locking block, and wherein said resilient means includes a spring which urges said locking block against said fixed stop means, said locking block being movable away from said fixed stop means against the urging of said spring.

14. The rotational dobby according to claim 12, wherein said shifting wedge has a guide groove therein, wherein said switching member includes a ring which extends around said shaft and engages said guide groove in said shifting wedge, and wherein said switching member has cam which is said portion thereof which is disposed between said flank surfaces on said locking block when said shifting wedge is in its radially outer position.

15. The rotational dobby according to claim 12, wherein said locking block has two slots therein which each extend approximately parallel to said centerline and which each slidably receive a respective pin which is fixedly secured on said eccentric ring.

16. The rotational dobby according to claim 12, wherein said locking block has a projecting pin thereon which is coaxial with said pivot axis of said locking block, and wherein said pin extends into a slot which is provided in said eccentric ring and which extends substantially radially of said shaft.

17. The rotational dobby according to claim 12, wherein said locking block has thereon a side surface which faces said shaft and has means defining a recess in said side surface, said flank surface being located in said recess on opposite side thereof, and wherein portions of said side surface on opposite sides of said recess are inclined relative to said centerline and serve as guide surfaces for said portion of said switching member.

18. The rotational dobby according to claim 12, wherein said pivot axis of said locking block intersects said centerline at a point on said centerline which is substantially intermediate the radially inner ends of said flank surfaces.

19. The rotational dobby according to claim 12, wherein said resilient means includes a leaf spring which is fixedly mounted at one end on said eccentric ring, has its other end disposed against a side of said locking block remote from said shaft, and extends in a direction approximately perpendicular to said centerline.

20. The rotational dobby according to claim 12, wherein said locking block has on each end thereof a stop surface which faces said shaft, and including two spaced pins which are fixedly supported on said eccentric ring said which can each engage a respective one of said stop surfaces on said locking block.

21. The rotational dobby according to claim 12, wherein said shaft has two said grooves therein on diametrically opposite sides thereof.

* * * * *

UNITED STATES PATENT AND TRADEMARK OFFICE
CERTIFICATE OF CORRECTION

PATENT NO. : 4 597 417
DATED : July 1, 1986
INVENTOR(S) : Rudolf SCHWARZ

It is certified that error appears in the above-identified patent and that said Letters Patent is hereby corrected as shown below:

Column 8, lines 35-36; change "as guide surface" to ---as guide surfaces---.

Column 10, line 19; change "flank surface" to ---flank surfaces---.

Column 10, line 20; change "on opposite side" to ---on opposite sides---.

Signed and Sealed this

Sixth Day of January, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,597,417

DATED : July 1, 1986

INVENTOR(S) : Rudolf Schwarz

It is certified that error appears in the above-identified patent and that said Letters Patent is hereby corrected as shown below:

Column 10, line 1, "has cam" should read -- has a cam --.

Signed and Sealed this

Seventeenth Day of March, 1987

Attest:

DONALD J. QUIGG

*Attesting Officer*   *Commissioner of Patents and Trademarks*